US005540254A

United States Patent [19]

McGowan et al.

[11] Patent Number: 5,540,254

[45] Date of Patent: Jul. 30, 1996

[54] APPARATUS FOR USE IN SERVICING AND INSTALLING REFRIGERATION SYSTEMS WITHOUT FREON LEAKAGE

[76] Inventors: Willie J. McGowan, 801 S. 141st St., Tacoma, Wash. 98444; Kenneth L. McGowan, 2723 147th St. East, Tacoma, Wash. 98445

[21] Appl. No.: 299,257

[22] Filed: Sep. 1, 1994

[51] Int. Cl.[6] .............................. F25B 45/00; F16K 51/00

[52] U.S. Cl. .............................. 137/315; 62/77; 62/149; 62/292; 137/565; 251/148

[58] Field of Search .............................. 62/77, 149, 292; 137/312, 315, 382, 565; 251/148

[56] References Cited

U.S. PATENT DOCUMENTS

| | | | |
|---|---|---|---|
| 3,118,463 | 1/1964 | Lacart | 62/77 |
| 3,208,232 | 9/1965 | Madison et al. | 62/149 |
| 3,302,421 | 2/1967 | Karnes et al. | 62/292 |
| 3,785,163 | 1/1974 | Wagner | 62/149 |
| 4,938,031 | 7/1990 | Manz et al. | 62/292 |
| 5,090,212 | 2/1992 | Keltner | 62/149 |
| 5,095,713 | 3/1992 | Laukhuf et al. | 62/149 |
| 5,099,653 | 3/1992 | Major et al. | 62/149 |
| 5,168,721 | 12/1992 | Hancock et al. | 62/292 |
| 5,170,632 | 12/1992 | Reilly, Jr. et al. | 62/149 |
| 5,172,562 | 12/1992 | Manz et al. | 62/149 |
| 5,189,881 | 3/1993 | Miles | 62/77 |
| 5,203,177 | 4/1993 | Manz et al. | 62/149 |
| 5,209,077 | 5/1993 | Manz et al. | 62/149 |
| 5,246,045 | 9/1993 | Clothier et al. | 62/292 |
| 5,272,882 | 12/1993 | Degier et al. | 62/292 |
| 5,322,092 | 6/1994 | Howeth et al. | 62/292 |

*Primary Examiner*—George L. Walton

[57] ABSTRACT

A system for use in servicing and installing refrigeration systems without freon leakage comprising a connector, the connector having a first extent with an outboard end and an inboard end, the connector also having a pair of second extents, each with an outboard end and an inboard end, the inboard ends of the first and second extents being coupled together for the passage of fluid therethrough, and a radial aperture formed in an intermediate region of the first extent.

2 Claims, 4 Drawing Sheets

FIG 4
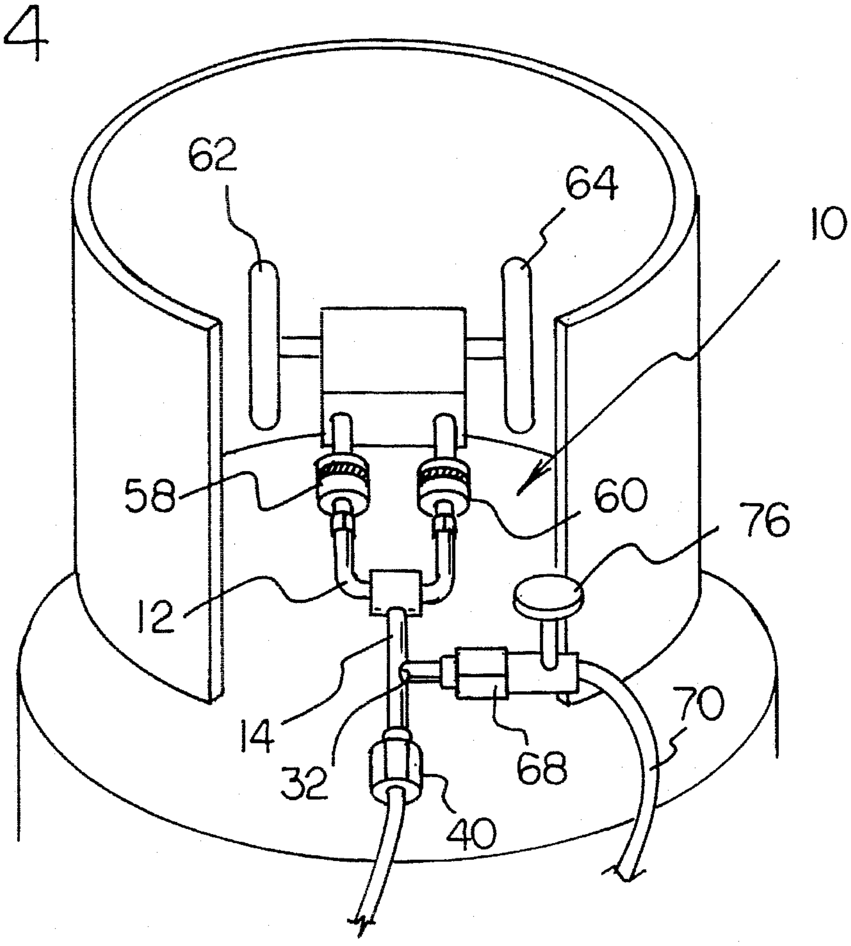
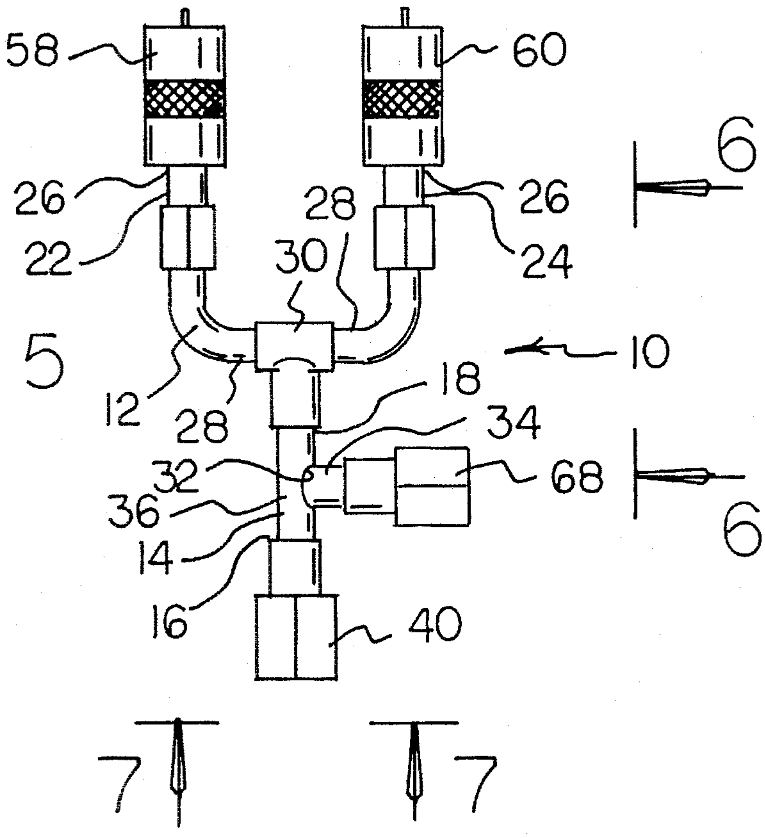
FIG 5

APPARATUS FOR USE IN SERVICING AND INSTALLING REFRIGERATION SYSTEMS WITHOUT FREON LEAKAGE

BACKGROUND OF THE INVENTION

1. Field of the Invention

The present invention relates to apparatus for use in servicing and installing refrigeration systems without freon leakage and more particularly pertains to service and install freon in refrigeration systems while prohibiting the release of refrigerant to the atmosphere.

2. Description of the Prior Art

The use of devices for servicing refrigeration systems and for installing and removing freon of a wide variety of designs and configurations is known in the prior art. More specifically, devices for servicing refrigeration systems and for installing and removing freon of a wide variety of designs and configurations heretofore devised and utilized for the purpose of servicing refrigeration systems as well as installing and removing freon with devices of a wide variety of designs are known to consist basically of familiar, expected, and obvious structural configurations, notwithstanding the myriad of designs encompassed by the crowded prior art which has been developed for the fulfillment of countless objectives and requirements.

By way of example, U.S. Patent Number U.S. Pat. No. 5,099,653 to Major et al discloses an apparatus for purification and recovery of refrigerant.

U.S. Pat. No. 5,203,177 to Manz et al discloses a refrigerant handling system with inlet refrigerant liquid/vapor flow control.

U.S. Pat. Nos. 5,209,077 to Manz et al and 5,230,224 to Ricketts et al disclose a refrigerant recovery system.

Lastly, U.S. Pat. No. 5,272,882 to Degier et al discloses a portable recycle/recovery/charging system with reconfigurable components.

In this respect, the apparatus for use in servicing and installing refrigeration systems without freon leakage according to the present invention substantially departs from the conventional concepts and designs of the prior art, and in doing so provides an apparatus primarily developed for the purpose of service and install freon in refrigeration systems while prohibiting the release of refrigerant to the atmosphere.

Therefore, it can be appreciated that there exists a continuing need for new and improved apparatus for use in servicing and installing refrigeration systems without freon leakage which can be used for service and install freon in refrigeration systems while prohibiting the release of refrigerant to the atmosphere. In this regard, the present invention substantially fulfills this need.

SUMMARY OF THE INVENTION

In view of the foregoing disadvantages inherent in the known types of devices for servicing refrigeration systems and for installing and removing freon of a wide variety of designs and configurations now present in the prior art, the present invention provides an improved apparatus for use in servicing and installing refrigeration systems without freon leakage. As such, the general purpose of the present invention, which will be described subsequently in greater detail, is to provide a new and improved G66Gapparatus for use in servicing and installing refrigeration systems without freon leakage and method which has all the advantages of the prior art and none of the disadvantages.

To attain this, the present invention essentially comprises a new and improved system for use in servicing and installing refrigeration systems without freon leakage comprising, in combination a connector in a generally Y-shaped configuration, the connector having a central linear extent with an outboard end and an inboard end, the connector also having a pair of parallel linear extents, each with an outboard end and an inboard end, the inboard ends of the central and parallel extents being coupled together for the passage of fluid therethrough, and a radial aperture formed in an intermediate region of the central linear extent; a rotatable fitting attached to the central extent at the outboard end and coupleable to a hose attachable to the refrigeration system to be serviced; a pair of supplemental rotatable fittings, each attached to one parallel extent at the outboard end and coupleable to a tank constituting a source of refrigerant; an additional rotatable fitting attached to the aperture of central extent and coupleable to a hose attachable to a source of vacuum; and a plurality of valves adapted to open and close the flow of fluid therethrough, one valve being operatively coupled with respect to the outboard ends of each parallel and central extent and one valve operatively coupled with respect to the additional rotatable fitting.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important., therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved apparatus for use in servicing and installing refrigeration systems without freon leakage which have all the advantages of the prior art devices for servicing refrigeration systems and for installing and removing freon of a wide variety of designs and configurations and none of the disadvantages.

It is another object of the present invention to provide a new and improved apparatus for use in servicing and installing refrigeration systems without freon leakage which may be easily and efficiently manufactured and marketed.

It is further object of the present invention to provide a new and improved apparatus for use in servicing and installing refrigeration systems without freon leakage which are of durable and reliable constructions.

An even further object of the present invention is to provide a new and improved apparatus for use in servicing and installing refrigeration systems without freon leakage which are susceptible of a low cost of manufacture with regard to both materials and labor, and which accordingly are then susceptible of low prices of sale to the consuming public, thereby making such apparatus for use in servicing and installing refrigeration systems without freon leakage economically available to the buying public.

Still yet another object of the present invention is to provide a new and improved apparatus for use in servicing and installing refrigeration systems without freon leakage which provide in the apparatuses and methods of the prior art some of the advantages thereof, while simultaneously overcoming some of the disadvantages normally associated therewith.

Even still another object of the present invention is to service and install freon in refrigeration systems while prohibiting the release of refrigerant to the atmosphere.

Lastly, it is an object of the present invention to provide a new and improved system for use in servicing and installing refrigeration systems without freon leakage comprising a connector, the connector having a first extent with an outboard end and an inboard end, the connector also having a pair of second extents, each with an outboard end and an inboard end, the inboard ends of the first and second extents being coupled together for the passage of fluid therethrough, and a radial aperture formed in an intermediate region of the first extent.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an enlarged perspective view of the connector employed for the servicing and installation of refrigeration systems as shown in FIG. 3.

FIG. 5 is a front elevational view of the connector utilized in the system of FIGS. 3 and 4.

The same reference numerals refer to the same parts through the various Figures.

DESCRIPTION OF THE PREFERRED EMBODIMENT

Figure 1:
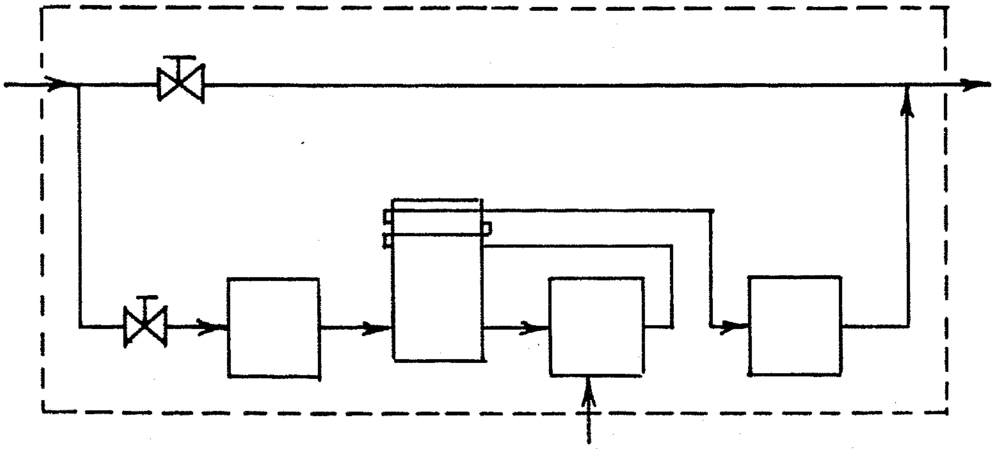
FIG 1 PRIOR ART
FIG. 1 is a schematic illustration of a conventional refrigeration system with freon recovery.
Figure 2:
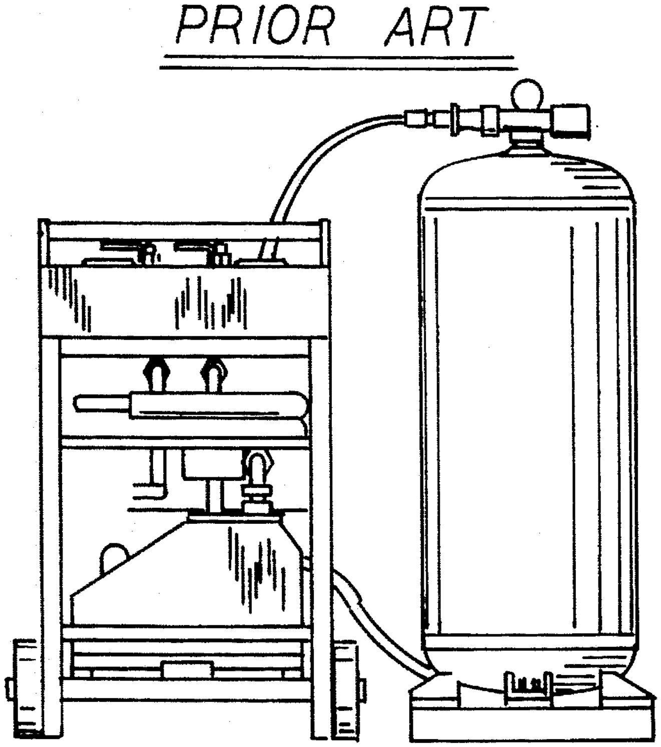
FIG 2 PRIOR ART
FIG. 2 is another illustration of a prior art device for freon recovery.
Figure 3:
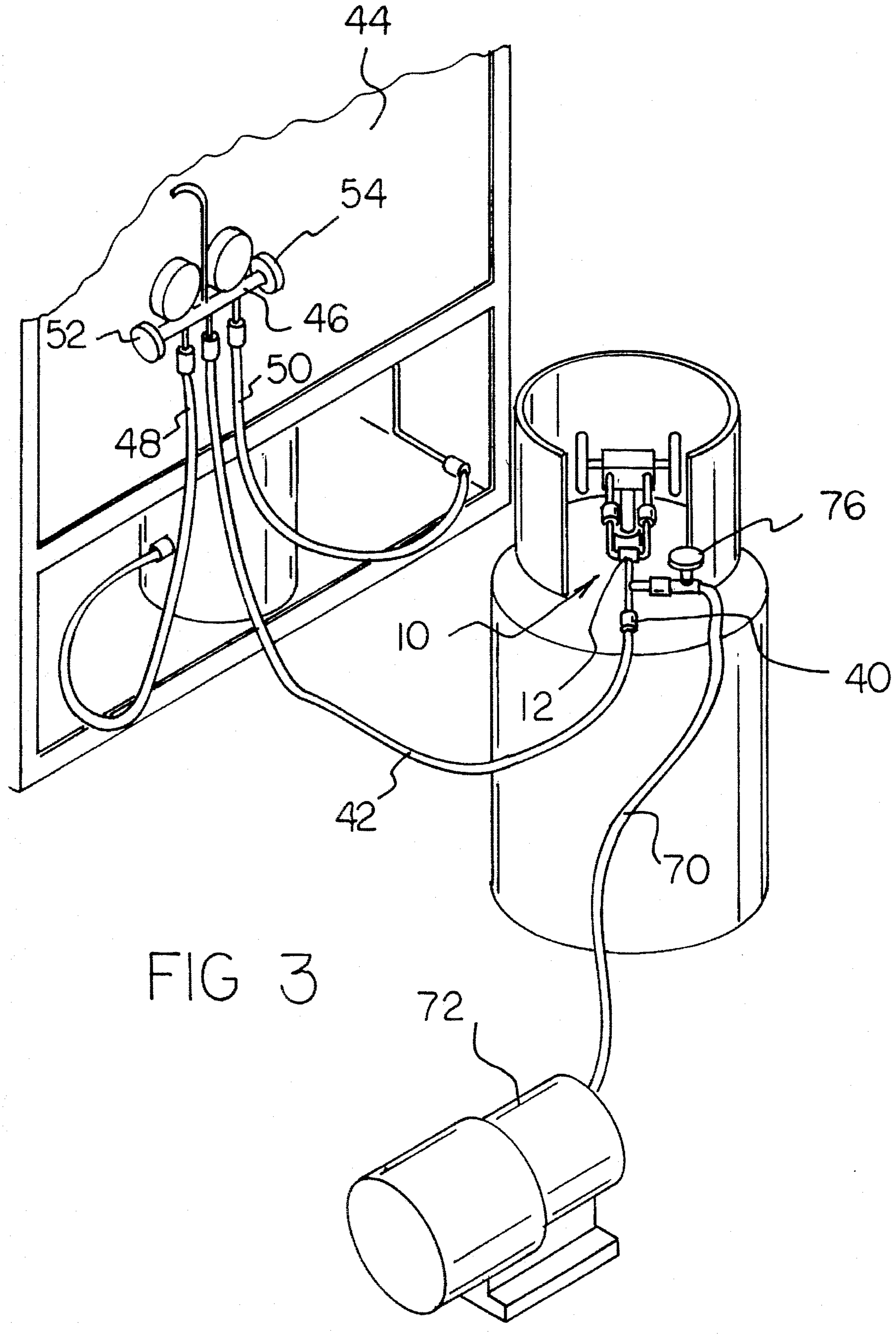
FIG. 3 is perspective view of the preferred embodiment of the new and improved apparatus for use in servicing and installing refrigeration systems without freon leakage constructed in accordance with the principles of the present invention.
Figure 6:
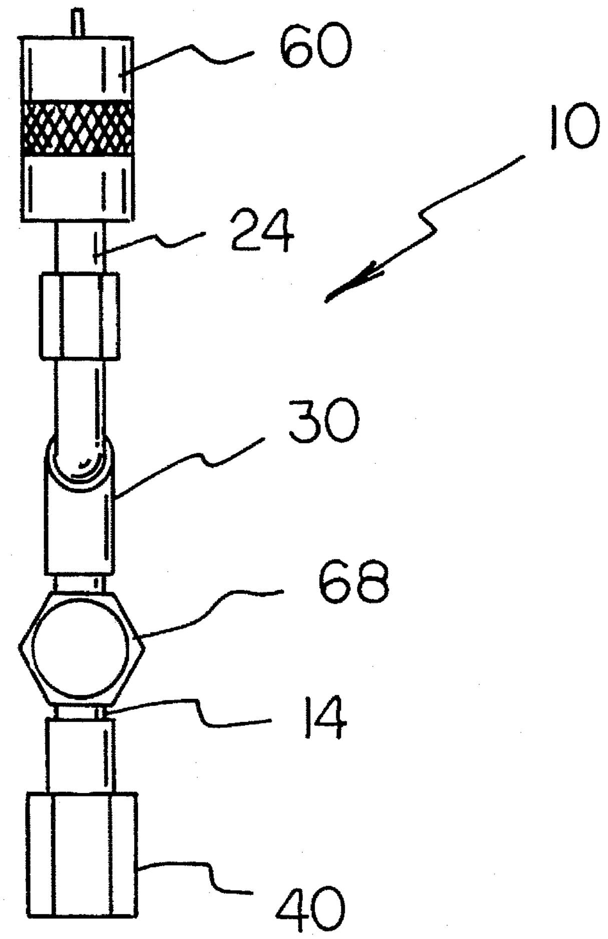
FIG. 6 is a side elevational view of the connector taken along line 6—6 of FIG. 5.
Figure 7:
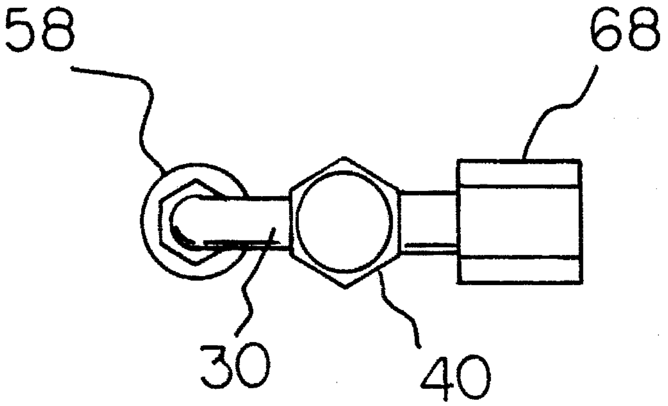
FIG. 7 is a bottom view of the connector taken along line 7—7 of FIG. 5.

With reference now to the drawings, and in particular to FIG. 1 thereof, the preferred embodiment of the new and improved apparatus for use in servicing and installing refrigeration systems without freon leakage embodying the principles and concepts of the present invention and generally designated by the reference numeral 10 will be described.

The present invention, the new and improved apparatus for use in servicing and installing refrigeration systems without freon leakage is comprised of a plurality of components. Such components in their broadest context include a connector, fittings and valves. Such components are individually configured and correlated with respect to each other so as to attain the desired objective.

More specifically, the system 10 for use in servicing and installing refrigeration systems without freon leakage has as its central component a connector 12. The connector is in a generally Y-shaped configuration. The connector has a first or central linear extent 14. Such extent has an outboard end 26 and an inboard end 18.

The connector also has a pair of second or parallel linear extents 22,24. Each has an outboard end 26 and an inboard end 28. The inboard ends 18, 28 of the central and parallel extents are coupled together at a Y-type joint 30. This is for the passage of fluid therethrough. In addition, a radial aperture 32 with a line 34 is formed in an intermediate region 36 of the central linear extent 14.

A rotatable fitting 40 is attached to the central extent. This is at the outboard end. Such fitting is coupleable to a hose 42. Such hose is attachable to the refrigeration system 44 to be serviced. Coupling is through a manifold 46 with lines 48, 50 into the high pressure (HI or red) side and low pressure (LO or blue) pressure side of the refrigeration system. High HI or red) and low (LO or blue) valves 52, 54 are coupled to the lines 48, 50 of the manifold.

A pair of supplemental rotatable fittings 58,60 are also provided. Each is attached to one parallel extent at the outboard end. These are then coupleable to a tank constituting a source of refrigerant. Such tank and adjacent fittings include high (HI or red) and low (LO or blue) 62, 64 valves to allow and terminate the flow of fluid therethrough.

An additional rotatable fitting 68 is also provided. Such fitting is attached to the aperture of central extent. It is coupleable to a hose 70 attachable to a source of vacuum 72.

As referred to above, a plurality of valves are provided. Such are adapted to open and close the flow of fluid therethrough. One valve 62,64 is operatively coupled with respect to each of the outboard ends of each central and parallel extent. Additionally, one valve 76 is operatively coupled with respect to the additional rotatable fitting to allow or terminate a vacuum to the connector.

The system 10 is particularly useful in adding freon to a new air conditioning system or one otherwise free or essentially free of freon. If freon is already in the air conditioning system, it must be evacuated as by conventional techniques which will not dispense the freon to the atmosphere.

The present invention is a device to be used in conjunction with, for example, the Worthington refrigerant recovery tank, or other similar tanks approved by DOT-4BA350. When servicing or recovering refrigerant from a domestic, commercial or industrial refrigeration system. This operation can be accomplished without the loss of any freon into the atmosphere.

The system 10 is constructed approximately 5 inches of ¼ inch copper tubing, two ¼ inch standard, inside threaded female fitting, with neoprene gasket and free spinning. Two ¼ inch standard threaded male fittings, one fitting will have a ⅛ inch outlet hole, the other fitting will have a ¼ inch outlet hole. Both fittings will have a built in Schrader valve core.

The system also includes a general hook-up when servicing a refrigeration system. With this hook-up, the entire system can be evacuated, charged or recharged without disconnecting any hoses until the charge is completed, without the loss of any freon into the atmosphere.

The present invention is used in servicing and installing refrigeration systems. In recent years, Federal laws have been enacted which prohibit the release into the atmosphere of materials such as the freon gas used in air conditioning and refrigeration units. This has been done because freon and other gases are harmful to the ozone layer that protects the earth from direct exposure from infrared rays of the sun. Huge taxes have also been levied on these materials to encourage their conservation and recovery. Prior to these actions, because of ignorance concerning the dangers involved, freon gas and the like were simply allowed to escape into the atmosphere during servicing operations. This device permits refrigeration systems to be evacuated, charged, or recharged without the loss of any refrigerant.

The present invention provides a Y-connection which is formed from copper tubing and fittings. It consists of the copper tubing, union-type connectors, and needle valves that are used for shut-off purposes. The Y-connection is attached to the charging manifold, a vacuum pump, and a recovery tank. With the present invention attached, all operations can be completed without disconnecting any lines that would allow the gas to escape into the atmosphere.

Once the present invention has been assembled, it can be taken from job to job, using the same model and size of recovery tank and equipment. Different makes of recovery tanks may require slight modifications in the basic design of the present invention.

The following steps are to be followed when servicing a refrigeration system with the hook-up above: (a) Tank is filled with freon and blue and red wheels are closed; (b) in order to pull a vacuum on the system, open both wheels on manifold HI and LOW side, and both service valves on HI and LOW side of system. Also open valve on hose from vacuum pump to system; (c) start vacuum pump. When the vacuum in the system is pulled down to approximately 27 or 28 inch vacuum, close shut off valve on hose from vacuum pump to system and HI and LOW side valves on manifold, then shut vacuum pump off; (d) after you select your charge, you can charge liquid or vapor freon into the system, the red wheel for vapor freon and the blue wheel for liquid freon; (e) after you select your charge, you can charge liquid or vapor freon into the system. The red wheel for vapor freon and the blue wheel for liquid freon; (d) for liquid freon close blue wheel on manifold gauge and open blue wheel on the tank. The system is now being charged with liquid freon. If the liquid freon stops flowing into the system or is flowing to slow, close the liquid wheel on tank and close service valve on HI side to system. Now open the vapor freon wheel on tank and manifold and start the system's compressor and the remaining charge will be sucked into the system as a vapor on the LOW side, without loosing any freon into the atmosphere. Charging has been completed. Close vapor side on tank and shut off service valves on HI and LOW side of system and remove equipment and cap service valve.

An electronic charging meter is tied into the system, which allows you to automatically select the required charge.

When the system is being evacuated, a dummy charge of 4 ounces of freon has to be programmed and discharged. This will purge the air out of the hose connected from tank to the charging meter.

After the charge is completed, close the tank shut off valve and program a dummy charge of 2 ounces of freon and discharge it to the system. This will clear all liquid or vapor freon from the hose between the tank and the charging meter, without loosing any freon into the atmosphere.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved system for use in servicing and installing refrigeration systems without freon leakage comprising, in combination:

a connector in a generally Y-shaped configuration, the connector having a central linear extent with an outboard end and an inboard end, the connector also having a pair of parallel linear extents, each with an outboard end and an inboard end, the inboard ends of the central and parallel extents being coupled together for the passage of fluid therethrough, and a radial aperture formed in an intermediate region of the central linear extent;

a rotatable fitting attached between the central extent at the outboard end and a hose attached to the refrigeration system to be serviced for allowing passage of fluid between the connector and refrigeration system;

a pair of supplemental rotatable fittings, each attached between one parallel extent at the outboard end and a tank constituting a source of refrigerant for allowing passage of fluid between he tank and connector;

an additional rotatable fitting attached between the aperture of central extent and a hose attached to a source of vacuum for allowing passage of air between the connector and source of vacuum; and a plurality of manually operated valves adapted to open and close the flow of fluid therethrough, a first valve being operatively coupled adjacent to the outboard ends of each parallel extent for controlling the flow of fluid and air between the tank and the connector and a second valve operatively coupled adjacent to the additional rotatable fitting for controlling the flow of fluid and air between the source of vacuum and the connector.

2. A system for use in servicing and installing refrigeration systems without freon leakage comprising:

a connector, the connector having a first extent with an outboard end and an inboard end, the connector also having a pair of second extents, each with an outboard end and an inboard end, the inboard ends of the first and second extents being coupled together for the passage of fluid therethrough, and a radial aperture formed in an intermediate region of the first extent;

a rotatable fitting attached between the first extent at the outboard end and a hose attached to the refrigeration system to be serviced for allowing passage of fluid between the connector and refrigeration system;

a pair of supplemental rotatable fittings, each fitting attached between one second extent at the outboard end and a tank constituting a source of refrigerant for allowing passage of fluid between the tank and connector;

an additional rotatable fitting attached between the aperture of the first extent and a hose attached to a source of vacuum for allowing passable of air between the connector and source of vacuum; and a plurality of manually operated valves adapted to open and close the flow of fluid therethrough, a first valve being operatively coupled adjacent to the outboard ends of each second extent for controlling the flow of fluid and air between the tank and the connector, and a second valve operatively coupled adjacent to the additional rotatable fitting for controlling the flow of fluid and air between the source of vacuum and the connector.

* * * * *